US012695310B2

(12) United States Patent
Ke et al.

(10) Patent No.: US 12,695,310 B2
(45) Date of Patent: Jul. 28, 2026

(54) POWER GRID SYSTEMS COMPRISING ENERGY STORAGE SYSTEM CONFIGURED TO SWITCH BETWEEN CURRENT SOURCE MODE AND VOLTAGE SOURCE MODE ON GRID CONNECTION AND METHODS FOR MANAGING THE SAME

(71) Applicant: Delta Electronics, Inc., Taoyuan City (TW)

(72) Inventors: Yi-Kuan Ke, Taoyuan City (TW);
Chia-Ching Lin, Taoyuan City (TW);
Yi-Kai Tseng, Taoyuan City (TW);
Chih-Han Ko, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 140 days.

(21) Appl. No.: 18/509,339

(22) Filed: Nov. 15, 2023

(65) Prior Publication Data

US 2025/0158415 A1 May 15, 2025

(51) Int. Cl.
*H02J 3/388* (2026.01)
*H02J 3/32* (2006.01)
(Continued)

(52) U.S. Cl.
CPC ................ *H02J 3/388* (2020.01); *H02J 3/32* (2013.01); *H02J 3/381* (2013.01); *H02J 3/40* (2013.01)

(58) Field of Classification Search
CPC ........ H02J 3/28–32; H02J 3/381; H02J 3/388; H02J 3/40–44; H02J 9/04–08
See application file for complete search history.

(56) References Cited

U.S. PATENT DOCUMENTS

| | | | |
|---|---|---|---|
| 10,756,543 | B2 | 8/2020 | Detmers et al. |
| 2017/0179722 | A1* | 6/2017 | Porter ...................... H02J 3/32 |

(Continued)

FOREIGN PATENT DOCUMENTS

| | | |
|---|---|---|
| AU | 2015230786 A1 | 10/2015 |
| CA | 3028486 A1 | 11/2009 |

(Continued)

OTHER PUBLICATIONS

English machine translation of CN108039716A published May 15, 2018 (Year: 2018).*

(Continued)

*Primary Examiner* — Rexford N Barnie
*Assistant Examiner* — David A Shiao
(74) *Attorney, Agent, or Firm* — Huan-Yi Lin

(57) ABSTRACT

The present disclosure relates to a power grid system and method of managing the same. According to the present invention, a power grid system is provided. The power grid system is adapted to supply electric power to at least one load unit, and the power grid system comprises a bus, a switching module, and an energy storage system coupled to the bus. The at least one load unit is coupled to the bus. The switching module comprises a switching device. The switching device is connected between the bus and a main grid. The energy storage system is configured to operate in a current source mode and a voltage source mode, and it is configured to receive a tripped signal from the switching module. The energy storage system is configured to switch to the voltage source mode when the energy storage system receives the tripped signal.

25 Claims, 5 Drawing Sheets

(51) Int. Cl.
    *H02J 3/38*            (2006.01)
    *H02J 3/40*            (2006.01)

(56)                    References Cited

U.S. PATENT DOCUMENTS

| | | | | |
|---|---|---|---|---|
| 2017/0229896 A1 | | 8/2017 | Kearns et al. | |
| 2018/0048158 A1 | * | 2/2018 | Somani | H02J 3/381 |
| 2022/0329070 A1 | * | 10/2022 | Chen | G05B 19/042 |
| 2024/0022082 A1 | * | 1/2024 | Dong | H02J 3/32 |
| 2024/0305096 A1 | * | 9/2024 | Zhang | H02J 3/381 |

FOREIGN PATENT DOCUMENTS

| | | | | | |
|---|---|---|---|---|---|
| CA | 3068091 | A1 | | 12/2018 | |
| CN | 104362665 | A | | 2/2015 | |
| CN | 106374501 | A | * | 2/2017 | H02J 3/14 |
| CN | 107508321 | A | | 12/2017 | |
| CN | 108039716 | A | | 5/2018 | |
| CN | 109449976 | A | | 3/2019 | |
| CN | 112615396 | A | * | 4/2021 | H02J 9/062 |
| CN | 116995708 | A | * | 11/2023 | H02J 3/32 |
| TW | 201743530 | A | | 12/2017 | |
| WO | 2012142841 | A1 | | 10/2012 | |

OTHER PUBLICATIONS

English machine translation of CN116995708A published Nov. 3, 2023 (Year: 2023).*
Taiwan Intellectual Property Office Search Report issued on Mar. 18, 2025, in Taiwan application No. 113125373, filed on Jul. 5, 2024.

* cited by examiner

POWER GRID SYSTEMS COMPRISING ENERGY STORAGE SYSTEM CONFIGURED TO SWITCH BETWEEN CURRENT SOURCE MODE AND VOLTAGE SOURCE MODE ON GRID CONNECTION AND METHODS FOR MANAGING THE SAME

BACKGROUND OF THE INVENTION

Field of the Invention

The technical field generally relates to a power grid system and method of managing the same; more particularly, to a power grid system that achieves grid-connected mode and standalone mode and methods of managing the same.

Description of Related Art

A power grid system including a group of loads and distributed energy resources located within a certain area and can act as a single controllable entity may be viewed as a microgrid. The loads can be one utility "customer," a grouping of several sites, or dispersed sites that operate in a coordinated fashion. The distributed energy resources can include reciprocating engine generators, microturbines, fuel cells, photovoltaic/solar and other small-scale renewable generators.

The microgrid can be operated in either a grid-connected mode or a standalone mode. In normal situation, the microgrid is operated in the grid-connected mode. In the grid-connected mode, the microgrid is connected to the main grid, which acts as the voltage source of the microgrid. When there is failure occurred in the main grid, the microgrid may be disconnected with the main grid and may switch to the standalone mode. In this case, a backup voltage supply has to replace the main grid and act as a voltage supply to stabilize the microgrid voltage.

In some cases, a generator can be used as a backup voltage supply when switching to the standalone mode. However, the startup of the generator can cause delay in switching of the voltage source. The time delays may cause the load terminal tripped or malfunctioned due to a sudden voltage drop. It is therefore desirable to have an improved grid power system having shorter delay time and methods of managing the same.

SUMMARY

According to the present invention, a power grid system is provided. The power grid system is adapted to supply electric power to at least one load unit, and the power grid system comprises a bus, a switching module, and an energy storage system coupled to the bus. The at least one load unit is coupled to the bus. The switching module comprises a switching device. The switching device is connected between the bus and a main grid. The energy storage system is configured to operate in a current source mode and a voltage source mode, and it is configured to receive a tripped signal from the switching module. The energy storage system is configured to switch to the voltage source mode when the energy storage system receives the tripped signal.

In one embodiment, the tripped signal is a feedback signal from the switching device.

In one embodiment, the energy storage system and the switching module are coupled by one or more cables, and the tripped signal is transmitted to the energy storage system through the one or more cables.

In one embodiment the energy storage system is configured to receive a closed signal from the switching module and configured to switch from the voltage source mode to the current source mode when the energy storage system receives the closed signal.

In one embodiment, the closed signal is a feedback signal from the switching device.

In one embodiment, the energy storage system and the switching module are coupled by one or more cables, and the closed signal is transmitted to the energy storage system through the one or more cables.

In one embodiment, the energy storage system is configured to receive a reconnection command signal from a control system and configured to synchronize the power grid system with the main grid when the energy storage system receives the reconnection command signal.

In one embodiment, the power grid system further comprises a voltage sensing unit configured to measure a voltage of the main grid and provide a voltage signal to the energy storage system.

In one embodiment, the energy storage system is configured to determine whether the power grid system is synchronized with the main grid according to the voltage signal.

In one embodiment, the energy storage system is configured to send a closing command signal when the energy storage system determines the power grid system is synchronized with the main grid.

In one embodiment, the energy storage system is configured to send a closing command signal to the switching module.

In one embodiment, the switching module further comprises an intelligent electronic device (IED) coupled to the switching device and configured to initiate a closing operation of the switching device, and the energy storage system is configured to send the closing command signal to the IED.

In one embodiment, the IED is configured to trip the switching device.

In one embodiment, the switching device comprises a contact switch.

In one embodiment, the power grid system further comprises at least one distributed electric generator coupled to the bus.

In one embodiment, the power grid system further comprises a transformer. The transformer comprises a first winding coupled to the switching device and a second winding coupled to the bus.

According to the present invention, a method for managing a power grid system is provided. The power grid system comprises a switching module and an energy storage system and adapted to supply electric power to at least one load unit through a bus. The switching module comprises a switching device connected between the bus and an external main grid. The energy storage system is coupled to the bus. The method comprises tripping the switching device, receiving a tripped signal from the switching module by the energy storage system, and switching an operation mode of the energy storage system from a current source mode to a voltage source mode when the energy storage system receives the tripped signal.

In one embodiment, the tripped signal is a feedback signal from the switching device.

In one embodiment, the energy storage system and the switching module are coupled by one or more cables, and the method comprises transmitting the tripped signal to the energy storage system through the one or more cables.

In one embodiment, the method further comprises closing the switching device, receiving a closed signal from the switching module by the energy storage system, and switching the operation mode of the energy storage system from the voltage source mode to the current source mode when the energy storage system receives the closed signal.

In one embodiment, the closed signal is a feedback signal from the switching device.

In one embodiment, the energy storage system and the switching module are coupled by one or more cables, and the method comprises transmitting the closed signal to the energy storage system through the one or more cables.

In one embodiment, the method further comprises synchronizing the power grid system with the main grid when the energy storage system receives a reconnection command signal from a control system.

In one embodiment, the method further comprises measuring a voltage of the main grid and providing a voltage signal to the energy storage system using a voltage sensing unit.

In one embodiment, the method further comprises determining whether the main grid is restored using the energy storage system according to the voltage signal.

In one embodiment, the method further comprises determining whether the power grid system is synchronized with the main grid using the energy storage system according to the voltage signal.

In one embodiment, closing the switching device comprises sending a closing command signal by the energy storage system to the switching module.

In one embodiment, the method comprises sending the closing command signal when the energy storage system determines the power grid system is synchronized with the main grid.

In one embodiment, the switching module comprises an intelligent electronic device (IED) coupled to the switching device, and closing the switching device comprises sending a closing command signal by the energy storage system to the IED and initiating a closing operation of the switching device using the IED.

In one embodiment, tripping the switching device comprises opening contacts of the switching device.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF PREFERRED EMBODIMENTS

Figure 1:
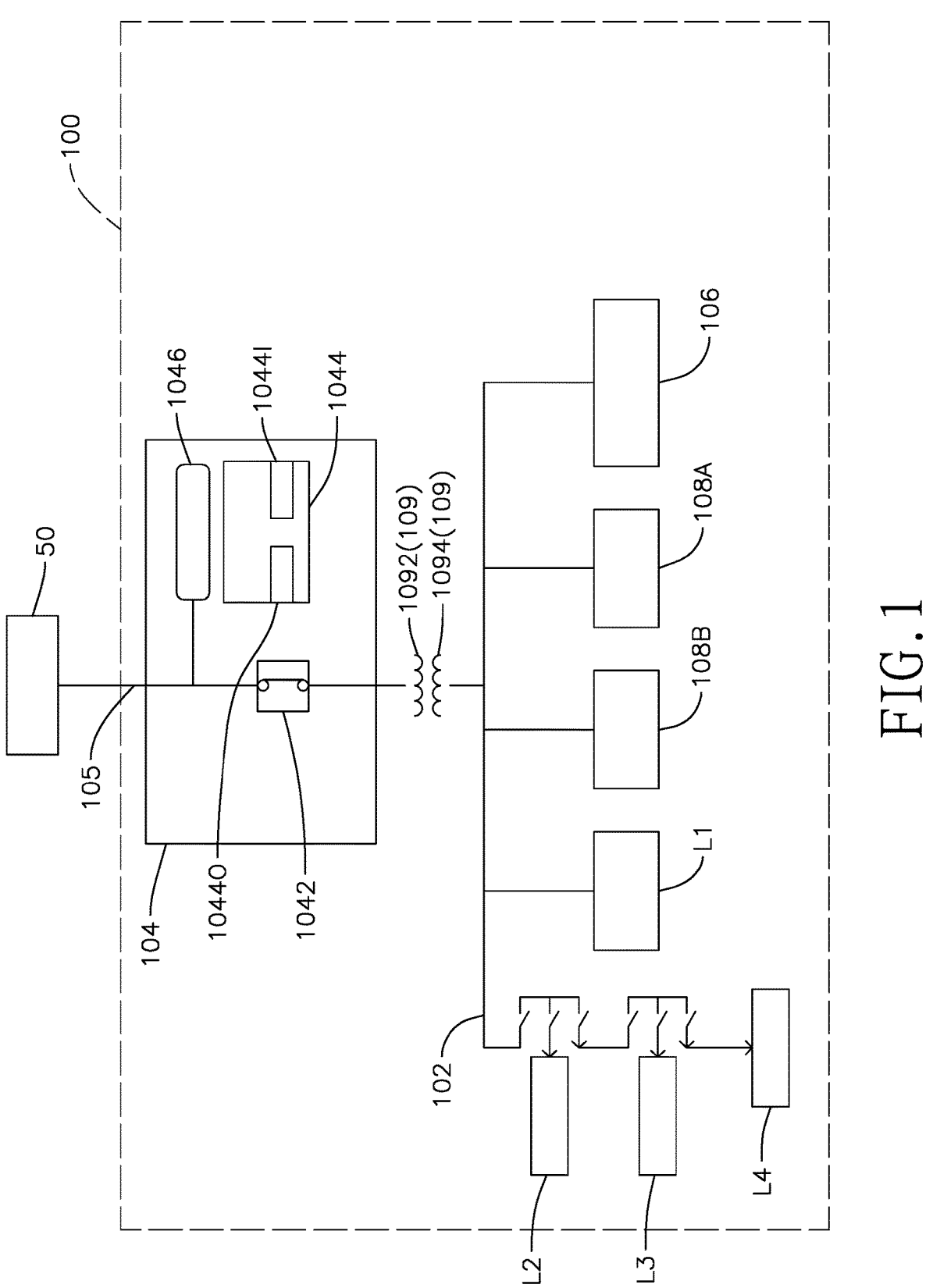
FIG. 1 is a block diagram of a power grid system according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of devices with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Furthermore, it should be understood that the terms, "comprising", "including", "having", "containing", "involving" and the like, used herein are open-ended, that is, including but not limited to. It will be understood that, as used herein, the phrase "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

FIG. 1 is a block diagram of a power grid system according to an embodiment of the present disclosure. Referring to FIG. 1, a power grid system 100 is provided. The power grid system 100 may be a microgrid system, which is a localized grouping of electricity generation, energy storage, and loads. The power grid system 100 may comprise a bus 102 (e.g., an AC bus), a switching module 104, and an energy storage system 106. The bus 102 may be coupled to a main grid 50, for example, a traditional centralized grid, a "macrogrid", or a power distribution grid, such that the power grid system 100 can be connected to and supplied by the main grid 50. The power grid system 100 is adapted to supply electric power to at least one load unit, e.g., load unit L1, load unit L2, load unit L3, and load unit L4. Each of the load unit L1, load unit L2, load unit L3, and load unit L4 may be coupled directly or indirectly to the bus 102. The load unit L1, load unit L2, load unit L3, and load unit L4 may be general load or critical load. The number of the load units is merely an example and is not intended to be limiting.

The power grid system 100 may further comprise at least one distributed electric generator. The distributed electric generator(s) can be photovoltaic/solar generator(s) 108A or diesel generator(s) 108B. The distributed electric generator (s) can also be reciprocating engine generator(s), microturbine generator(s), fuel cell(s), wind turbine generator(s), hydroelectric generator(s), other small-scale renewable generator(s), and the like. As shown in FIG. 1, the distributed electric generators 108A and 108B are coupled to the bus 102 and may provide power to the load units L1, L2, L3, and L4 through the bus 102. The number of the distributed electric generators is merely an example and is not intended to be limiting.

The energy storage system 106 may include DC/AC converter(s) and a plurality of storage cells, for example, lead-acid cells, nickel-cadmium cells, nickel metal hydride batteries, sodium-sulfur cells, lithium cells or a fuel cells. The kind of the storage cell is not limited to those mentioned in the present embodiment. The energy storage system 106 may also include super capacitor(s) or flywheel(s). In some embodiments, at least one of the DC/AC converter(s) may be a three-phase converter. The energy storage system 106 may be coupled to the bus 102. The energy storage system 106 may be employed to provide stable power to the load units L1, L2, L3, and L4. For example, the energy storage system 106 may be charged by the distributed electric generator 108A during times of excess power generation, and the energy storage system 106 may provide supplementary power when power generation from the distributed electric generator 108A (and the distributed electric generator 108B) is low, for example during the night or overcast days in the case of solar power, or when power demands from the load units L1, L2, L3, and L4 are high.

The energy storage system 106 may further include a processing circuit which can include digital and/or analog circuitry such as one or more controllers, processors, application-specific integrated circuits (ASICs), etc., for executing program code which performs the one or more processes described herein. The energy storage system 106 may also include one or more storage media such as random access memory (RAM), read-only memory (ROM), hard drive storage, temporary storage, non-volatile memory, flash memory, optical memory, or any other suitable memory for storing the program code and related data processed and accessed by the processing circuit, during execution of the program code. The storage medium may also store the results generated by the energy storage system 106.

The switching module 104 may comprise a switching device 1042. In some embodiments, the switching device 1042 may comprise a contact switch, for example, a circuit breaker such as oil circuit breaker, air-blast circuit breaker, SF$_6$ circuit breaker, vacuum circuit breaker, miniature circuit breaker (MCB), molded case circuit breaker (MCCB), the like, etc. The switching device 1042 may further comprise operative mechanism for the closing operation and the tripping operation of the switching device 1042. However, the present disclosure is not limited thereto. As shown in FIG. 1, the switching device 1042 is connected between the bus 102 and the main grid 50. As shown in FIG. 1, the switching device 1042 may be connected to a high voltage feeder 105 of the main grid 50. The switching device 1042 may be configured to selectively allow the flow of current between the bus 102 and the main grid 50, such that the power grid system 100 is separable from the main grid 50 by opening at least the switching device 1042.

Specifically, the power grid system 100 is configured to be connected to the main grid 50 in a grid-connected mode and isolated from the main grid 50 (and other power grids, in some instances) in the standalone mode. The power grid system 100 can achieve the grid-connected mode and the standalone mode through the connection/disconnection of the switching device 1042.

As shown in FIG. 1, when the power grid system 100 operates in the grid-connected mode, the switching device 1042 is in the turned-on state. In this condition, the energy storage system 106 may be charged by at least one of the distributed electric generators (e.g., distributed electric generator 108A) and/or the main grid 50; or, in some cases, the energy storage system 106 may operate in a current source mode in which the operation of the energy storage system 106 is similar to a current source. The energy storage system 106 may refer to the voltage and frequency of the power grid system 100 (e.g., the voltage and frequency of the bus 102) or the main grid 50, and power electricity generated from the energy storage system 106 is fed to the power grid system 100 to supply power to the load units L1, L2, L3, and L4.

When failure occurred in the main grid 50 or in other area grid connected to the main grid 50 under the grid-connected mode, the switching device 1042 may be tripped. The switching device 1042 is therefore in the turned-off state and the power grid system 100 may operate in the standalone mode. In this condition, the energy storage system 106 may operate in a voltage source mode in which the energy storage system 106 is a voltage source for the power grid system 100. The energy storage system 106 may supply the power electricity to the load units L1, L2, L3, and L4 and may provide a bus voltage on the bus 102 for the distributed electric generators 108A and 108B.

The switching module 104 may further comprises an intelligent electronic device (IED) 1044 coupled to the switching device 1042. The IED 1044 may be configured to measure electrical characteristics of power flowing through the switching device 1042 and determine a fault is occurring using the measurements. In some embodiments, the IED 1044 is configured to trip the switching device 1042.

As shown in FIG. 1, the power grid system 100 may further comprise a voltage sensing unit 1046. The voltage sensing unit 1046 is configured to measure a voltage of the main grid 50 and provide a voltage signal VS to the energy storage system 106. In one embodiment, the voltage sensing unit 1046 may be voltmeter or a potential transformer (PT) with its higher voltage side connected to the main grid 50 (e.g., the high voltage feeder 105 of the main grid 50) and a voltmeter connected to its lower voltage side utilized for measuring a proportionate voltage on the main grid 50.

As shown in FIG. 1, the power grid system 100 may further comprise a transformer 109. For example, the switching module 104 may be located in a power substation, and the power substation may include the transformer 109 that step the voltages down to distribution voltages, and one or more distribution busses (e.g., bus 102) may split the stepped-down distribution voltages off in multiple directions. The switching device 1042 may be configured to disconnect the power substation (or a portion thereof) and the rest of the power grid system 100 from the main grid 50 or to disconnect one or more distribution lines from the power substation. The transformer 109 may comprises a first winding 1092 and a second winding 1094. As shown in FIG. 1, the first winding 1092 is coupled to the switching device 1042, and the second winding 1094 is coupled to the bus 102. The switching device 1042 may be configured to isolate the rest of the power grid system 100 from the main grid 50 to start a standalone mode of the power grid system 100. However, the present disclosure is not limited thereto.

Although the power grid system 100 in FIG. 1 is illustrated with a single line diagram, the power grid system 100 may be structured to transmit single phase or multiphase power. Although the power grid system 100 is an alternating current power system, other embodiments may include direct current power systems, such as a DC power distribution system. Furthermore, it shall be appreciated that the topology of the power grid system 100 is illustrated for the purpose of explanation and is not intended as a limitation of the present disclosure.

Figure 2:
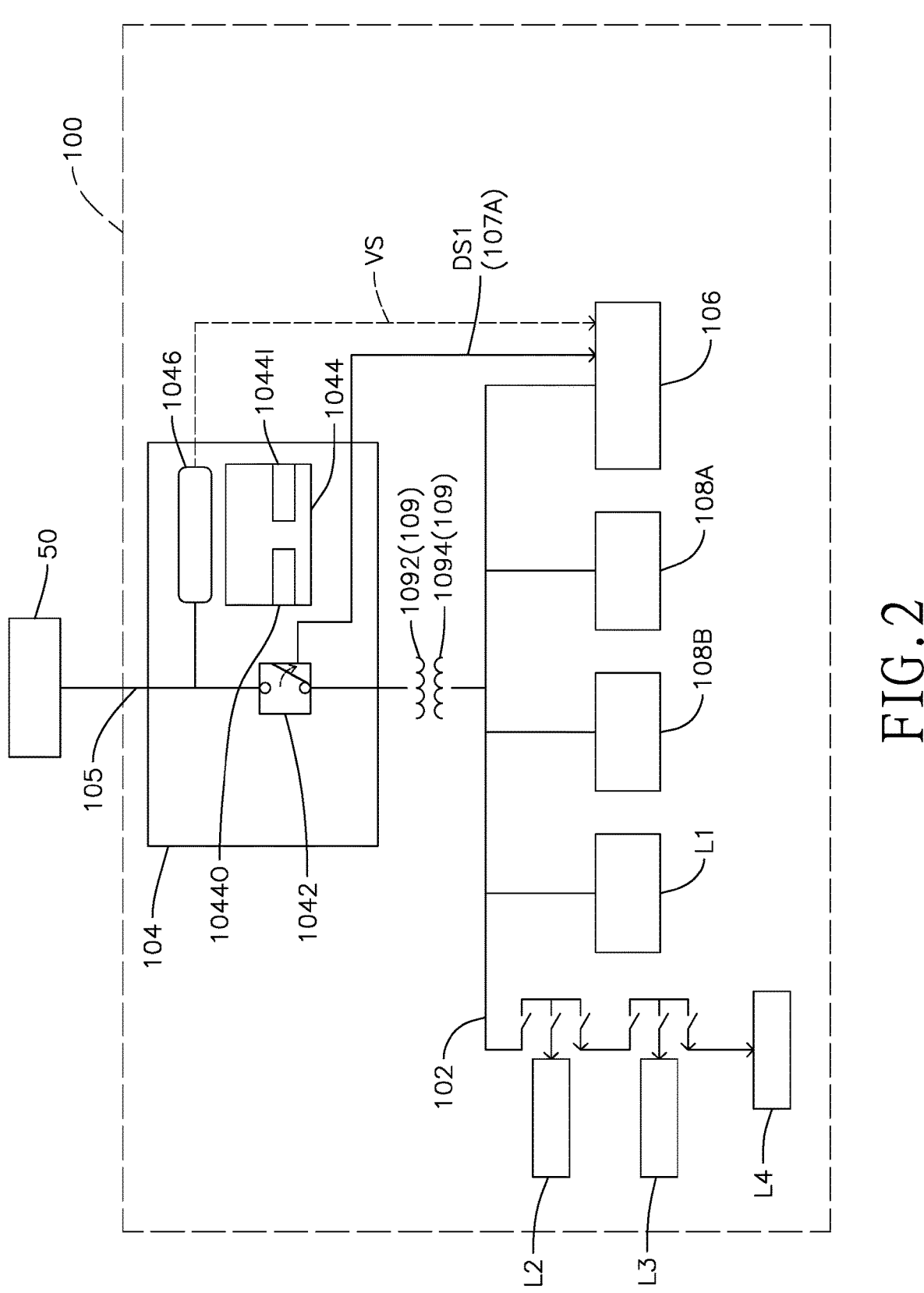
FIG. 2 is a block diagram of a power grid system switching to a standalone mode according to an embodiment of the present disclosure.

FIG. 2 is a block diagram of a power grid system switching to a standalone mode according to an embodiment of the present disclosure. As shown in FIG. 2, the switching device 1042 is tripped. The switching device 1042 may be tripped by the IED 1044 as discussed above. In some embodiments, the switching device 1042 may be controlled remotely by a control system (e.g., a SCADA (Supervisory Control and Data Acquisition) system). In some embodiments, the switching device 1042 may be tripped due to failure occurred in the main grid 50 or in other area grid connected to the main grid 50.

The energy storage system 106 disclosed herein may be configured to receive a tripped signal DS1 from the switching module 104. In some embodiments, the tripped signal DS1 is a feedback signal from the switching device 1042. Specifically, the switching device 1042 may be configured to output status signal(s). The status signal(s) may be feedback signal(s), such as a TRIPPED feedback signal, an On/Off feedback signal, a CLOSED feedback signal, the like, or combinations thereof, indicating operational states of the switching device (e.g., a circuit breaker). In some embodiments, the switching device 1042 may comprise a control FSM (Finite State Machine) configured to output the feedback signals. The feedback signals may be digital signals. However, the present disclosure is not limited thereto. In some embodiments, the tripped signal may be a signal from the IED 1044. The energy storage system 106 may be configured to receive signals from the switching module 104. The energy storage system 106 may include a receiver card, such that the energy storage system 106 can receive signals from the switching module 104 and operate accordingly. For example, the energy storage system 106 may be configured to receive a TRIPPED feedback signal and/or an On/Off feedback signal signals. However, the present disclosure is not limited thereto.

The energy storage system 106 disclosed herein may be further configured to switch to the voltage source mode when the energy storage system 106 receives the tripped signal DS1. As discussed above, the energy storage system 106 is configured to operate in a current source mode and in a voltage source mode. For example, when the power grid system 100 operates in the grid-connected mode, the energy storage system 106 may operate in the current source mode. The energy storage system 106 disclosed herein may be configured to switch from the current source mode to the voltage source mode through, for example, the processing circuits and/or a switching module in the energy storage system 106, when the energy storage system 106 receives the tripped signal DS1.

With the arrangements disclosed herein, the energy storage system 106 may be able to complete switching to voltage source mode and to provide a bus voltage to the load units L1, L2, L3, and L4 and the distributed electric generators 108A and 108B within a comparatively short period of time. As such, the load units L1, L2, L3, and L4 may be continuously supplied by the power grid system 100. Moreover, since the distributed electric generators 108A and 108B may also be continuously supplied by the power grid system 100, the distributed electric generators 108A and

108B may continuously generate power to the power grid system 100. Therefore, the power grid system 100 may be able to continuously supply power without interruption even during the transition of the power grid system 100 from the grid-connected mode to the standalone mode. Furthermore, the energy storage system 106 disclosed herein may be configured to operate according to the feedback signals from the switching device 1042, such that additional computation or signal processing is not required, and the transition of the energy storage system 106 can be conducted without further delay. It is noted that during the transition of the energy storage system 106, the remained voltage on the bus 102 may continuously supply power to the load units L1, L2, L3, and L4 and the distributed electric generators 108A and 108B for a certain period of time.

As shown in FIG. 2, in some embodiments, the energy storage system 106 and the switching module 104 are coupled by one or more cables. The cable(s) may include an electric cable, a fiber-optic cable, a power line, the like, or combinations thereof. In some embodiments, the tripped signal DS1 may be transmitted to the energy storage system 106 through the one or more cables, e.g., the cable 107A. With the arrangement disclosed herein, the energy storage system 106 may receive the tripped signal DS1 directly from the switching device 1042 without transmitting the signal(s) to and/or processing the signal(s) by a third device (e.g., a control system, such as a SCADA system), such that the receiving of the tripped signal DS1 and the switching of the operation mode may be conducted without further delay.

Figure 3:
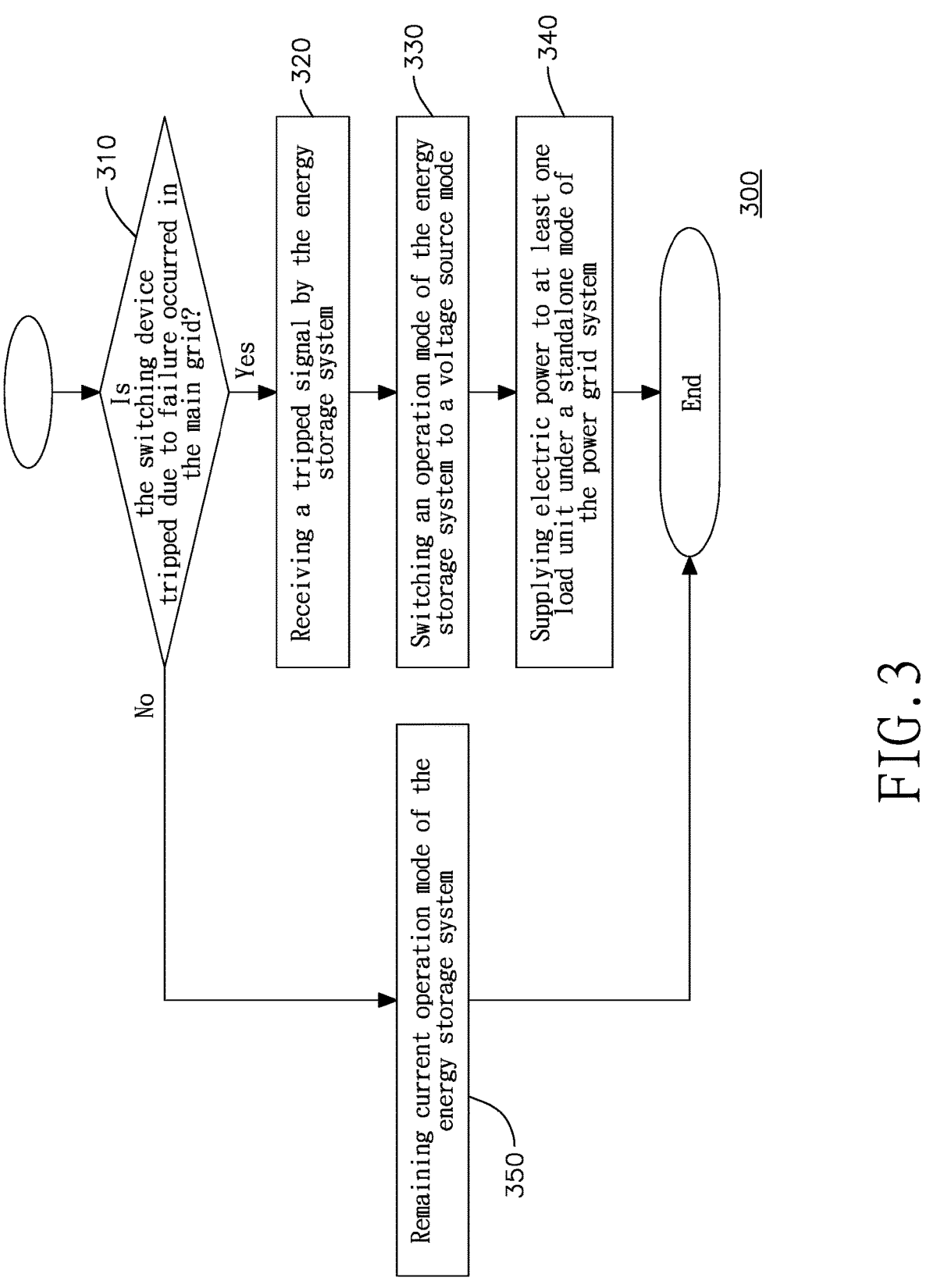
FIG. 3 is a flow diagram of a method for managing a power grid system according to an embodiment of the present disclosure.

FIG. 3 is a flow diagram of a method for managing a power grid system (e.g., the power grid system 100 shown in FIGS. 1 and 2) according to an embodiment of the present disclosure. Referring to FIGS. 2 and 3, the power grid system 100 may comprise a switching module 104 and an energy storage system 106. The power grid system 100 may be adapted to supply electric power to at least one load unit (e.g., load units L1, L2, L3, and L4) through a bus 102. The switching module 104 may comprise a switching device 1042. The switching device 1042 may be connected between the bus 102 and a main grid 50. The energy storage system 106 is coupled to the bus 102.

The method 300 includes tripping the switching device 1042 (step 310). In some embodiments, the switching device 1042 may be a contact switch and tripping the switching device 1042 may comprise opening contacts of the switching device 1042. The method 300 includes receiving a tripped signal (e.g., the tripped signal DS1) from the switching module 104 by the energy storage system 106 (step 320), if the switching device 1042 is tripped, for example, due to failure occurred in the main grid 50. The method 300 includes switching an operation mode of the energy storage system 106 from a current source mode (or in some instances, from other operation mode) to a voltage source mode when the energy storage system 106 receives the tripped signal DS1 (step 330). The method 300 may further comprise supplying electric power to at least one load unit (e.g., load units L1, L2, L3, and L4) under a standalone mode of the power grid system 100 (step 340). In the method 300, if the switching device 1042 is not tripped, the energy storage system 106 may not receive the tripped signal DS1, and the energy storage system 106 remains current operation mode thereof (step 350).

Figure 4:
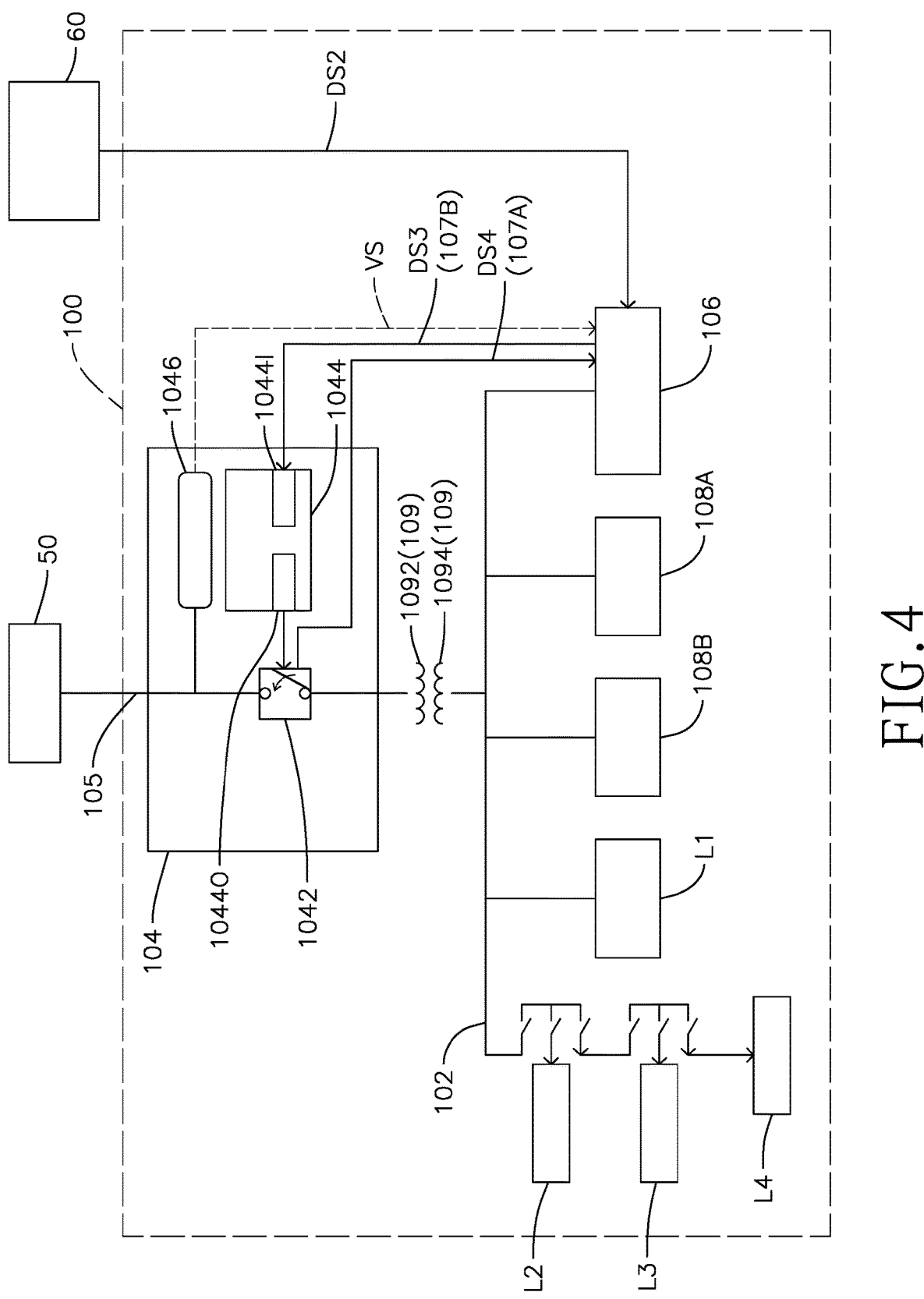
FIG. 4 is a block diagram of a power grid system switching to grid-connected mode according to an embodiment of the present disclosure.

FIG. 4 is a block diagram of a power grid system switching to grid-connected mode according to an embodiment of the present disclosure. As shown in FIG. 4, the power grid system 100 is still operate under the standalone mode, and the switching device 1042 is in an off state. The switching device 1042 may be ready to close. In some embodiments, a RTC (Ready To Close) feedback signal from the switching device 1042 may be received by the energy storage system 106. However, the present disclosure is not limited thereto.

The energy storage system 106 may be configured to receive a reconnection command signal DS2 from a control system 60. Specifically, in some embodiments, a control system 60 may execute a restoration switching analysis (RSA) to determine a service restoration switching plan. The control system 60 may send one or more command signals such as the reconnection command signal DS2 in order to close the switching device 1042 to reconnect the power grid system 100 to the main grid 50.

In some embodiments, the energy storage system 106 is configured to synchronize the power grid system 100, or, the energy storage system 106, with the main grid 50. Specifically, in the standalone mode, the power grid system 100 may operate in a different frequency and voltage, compared to main grid frequency and voltage. The energy storage system 106 may be configured to control and adjust the frequency, the voltage magnitude, and the phase angle of the power grid system 100 to match that of the main grid 50. The energy storage system 106 may be configured to synchronize the power grid system 100 with the main grid 50 when the energy storage system 106 receives the reconnection command signal DS2.

In some embodiments, the energy storage system 106 is configured to determine whether the power grid system 100 is synchronized with the main grid 50. As discussed above with respect to FIG. 1, the power grid system 100 may further comprise a voltage sensing unit 1046 that measures voltage of the main grid 50 and provide voltage signals VS to the energy storage system 106. The energy storage system 106 may be configured to receive the voltage signal VS, and determine whether the power grid system 100 is synchronized with the main grid 50 according to the voltage signal VS. The energy storage system 106 may be phase-locked when the power grid system 100 is synchronized with the main grid 50.

As shown in FIG. 4, the energy storage system 106 may be further configured to send a closing command signal DS3 when the energy storage system 106 determines the power grid system 100 is synchronized with the main grid 50. The energy storage system 106 may be configured to send the closing command signal DS3 to the switching module 104. In the embodiment where the switching module 104 further comprises an IED 1044, the IED 1044 may be configured to initiate a closing operation of the switching device 1042, and the energy storage system 106 is configured to send the closing command signal DS3 to the IED 1044. Specifically, instead of sending the closing command signal DS3 directly to the switching device 1042, in some embodiments, the energy storage system 106 is configured to send the closing command signal DS3 to a digital input 1044I of the IED 1044, while the IED 1044 is configured to output a closing signal from a digital output 1044O of the IED 1044 to initiate a closing operation of the switching device 1042. In the situation where the switching device 1042 is high-voltage circuit breaker, the arrangement disclosed herein may enable the energy storage system 106 to manage the closing operation of the switching device 1042. However, the present disclosure is not limited thereto. In some other embodiments, the closing command signal DS3 may be send to the switching device 1042 to initiate the closing operation of the switching device 1042.

Similar to that discussed above with regard to FIG. 2, the energy storage system 106 may be configured to receive a closed signal DS4 from the switching module 104. Specifically, the switching device 1042 may be configured to output a closed signal DS4, such as a CLOSED feedback signal and/or an On/Off feedback signal. The closed signal DS4 may be a feedback signal from the switching device 1042. The energy storage system 106 may include a receiver card to receive the closed signal DS4. The closed signal DS4 may be a digital signal. However, the present disclosure is not limited thereto. The energy storage system 106 may further be configured to switch from the voltage source mode to the current source mode when the energy storage system 106 receives the closed signal DS4.

In the embodiment shown in FIG. 4, the power grid system 100 operates in the standalone mode, and the energy storage system 106 may operate in the voltage source mode. The energy storage system 106 disclosed herein may be configured to switch from the voltage source mode to the current source mode through, for example, the processing circuits and/or the switching module in the energy storage system 106, when the energy storage system 106 receives the closed signal DS4.

Similar to that discussed above with respect to FIG. 2, in some embodiments, the energy storage system 106 and the switching module 104 are coupled by one or more cables. In some embodiments, the closed signal DS4 may be transmitted to the energy storage system 106 through the one or more cables, e.g., the cable 107A. In some embodiments, the closed signal DS4 may be transmitted through the same cable as the tripped signal DS1. However, the closed signal DS4 may be transmitted through a cable different from that of the tripped signal DS1. With the arrangement disclosed herein, the receiving of the closed signal DS4 and the switching of the operation mode may be conducted without further delay.

Figure 5:
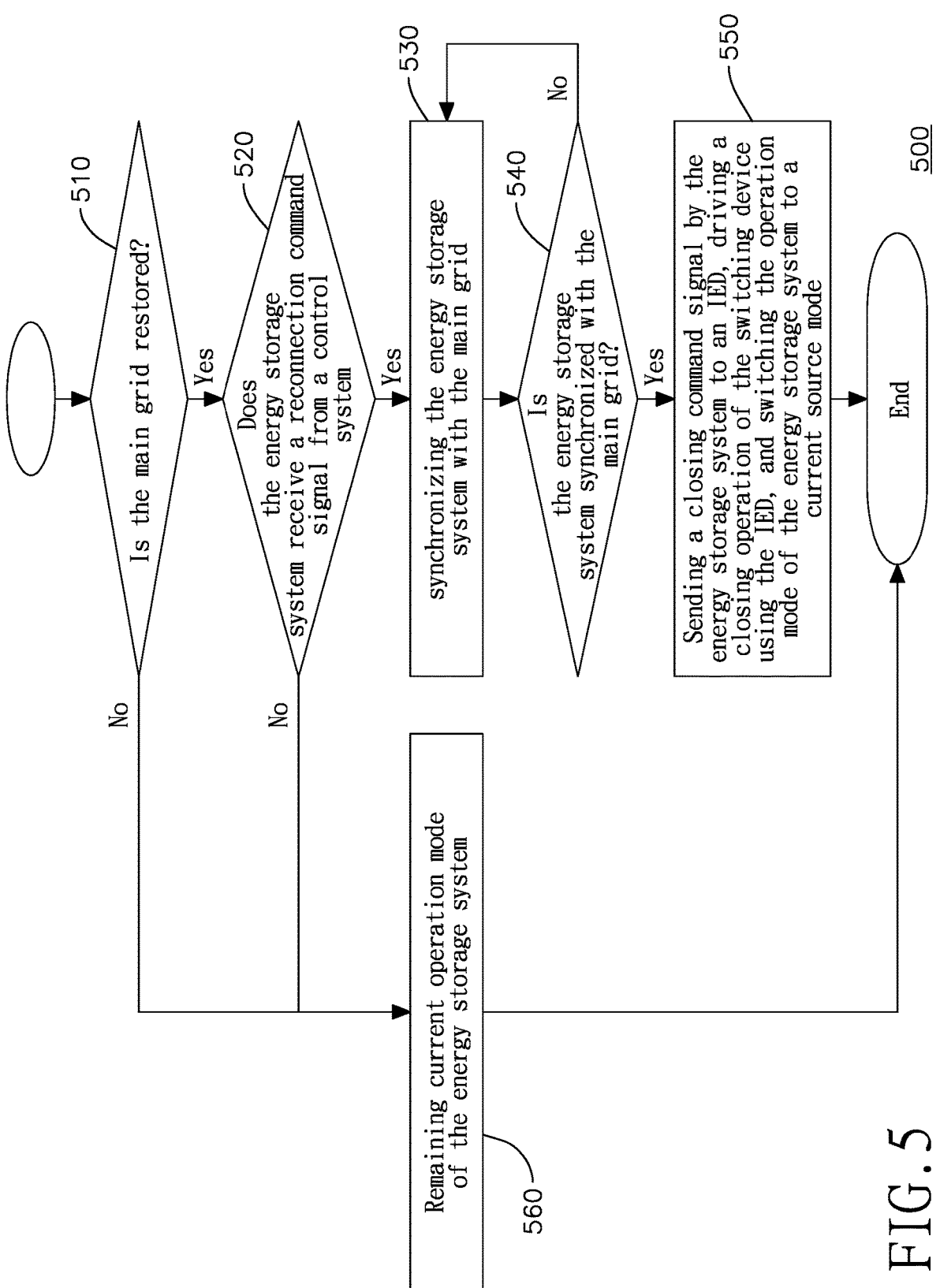
FIG. 5 is a flow diagram of a method for managing a power grid system according to an embodiment of the present disclosure.

FIG. 5 is a flow diagram of a method for managing a power grid system (e.g., the power grid system 100 shown in FIGS. 1, 2 and 4) according to an embodiment of the present disclosure. Referring to FIGS. 4 and 5, in the method 500, the main grid 50 may be restored (step 510). The energy storage system 106 receives a reconnection command signal DS2 from a control system 60 (step 520). The method 500 further comprises synchronizing the power grid system 100 with the main grid 50 when the energy storage system 106 receives the reconnection command signal DS2 from the control system 60 (step 530).

The method 500 may further comprise determining whether the power grid system 100 is synchronized with the main grid 50 (step 540). In some embodiments, the method 500 further comprises measuring a voltage of the main grid 50 and providing a voltage signal VS to the energy storage system 106 using a voltage sensing unit 1046, and whether the power grid system 100 is synchronized with the main grid 50 may be determined according to the voltage signal VS.

The method 500 further includes closing the switching device 1042. Closing the switching device 1042 may comprise sending a closing command signal DS3 by the energy storage system 106 to the switching module 104. The energy storage system 106 may send the closing command signal DS3 when the energy storage system 106 determines the power grid system 100 is synchronized with the main grid 50. In the embodiment where the switching module 104 further comprises an intelligent electronic device (IED) 1044 coupled to the switching device 1042, closing the switching device 1042 may comprise sending a closing command signal by the energy storage system 106 to the IED 1044 and initiating a closing operation of the switching device 1042 using the IED 1044.

In some embodiments, the method 500 further comprises receiving a closed signal DS4 from the switching module 104 by the energy storage system 106, wherein the closed signal is a feedback signal from the switching device 1042. The method 500 may further comprise switching the operation mode of the energy storage system 106 from the voltage source mode to the current source mode when the energy storage system 106 receives the closed signal DS4 (Step 550).

In the method 500, if the main grid 50 is not restored, the energy storage system 106 remains current operation mode thereof (step 560). In some embodiments, the method 500 may further comprise determining whether the main grid 50 is restored using the energy storage system 106 according to the voltage signal VS. In the method 500, if the energy storage system 106 does not receive a reconnection command signal DS2 from the control system 60, the energy storage system 106 remains current operation mode thereof (step 560). In the method 500, if the power grid system 100 is determined as not synchronized with the main grid 50 by the energy storage system 106, the method 500 is proceeded to synchronizing the power grid system 100 with the main grid 50 (Step 530).

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present disclosure covers modifications and variations that come within the scope of the appended claims and their equivalents.

What is claimed is:

1. A power grid system adapted to supply electric power to at least one load unit, the power grid system comprising:
   a bus, the at least one load unit coupled to the bus;
   a switching module comprising a switching device and an intelligent electronic device (IED) coupled to the switching device, the IED configured to monitor electrical characteristics of power flowing through the switching device to determine a fault is occurring and trip the switching device in response, the switching device connected between the bus and a main grid and configured to output a tripped signal when the switching device is tripped, wherein the tripped signal is a feedback signal indicating a status of the switching device;
   an energy storage system coupled to the bus, the energy storage system comprising a plurality of storage cells and configured to supply power electricity to the at least one load unit, the energy storage system configured to operate in a current source mode and a voltage source mode, and the energy storage system comprising a receiver card to receive the tripped signal from the switching module; and
   wherein the energy storage system comprises a processing circuit configured to switch the energy storage system to the voltage source mode when the energy storage system receives the tripped signal; and
   wherein the energy storage system and the switching module are coupled by one or more cables, and the tripped signal is transmitted directly from the switching device to the energy storage system through the one or more cables.

2. The power grid system of claim 1, wherein the energy storage system is configured to receive a closed signal from the switching module and configured to switch from the voltage source mode to the current source mode when the energy storage system receives the closed signal.

3. The power grid system of claim 2, wherein the closed signal is a feedback signal from the switching device.

4. The power grid system of claim 2, wherein the closed signal is transmitted to the energy storage system through the one or more cables.

5. The power grid system of claim 1, wherein the bus comprises an AC bus, and the energy storage system comprises a DC/AC converter coupling an energy storage device to the bus; and wherein the energy storage system is configured to receive a reconnection command signal from a control system and configured to synchronize the power grid system with the main grid when the energy storage system receives the reconnection command signal.

6. The power grid system of claim 1 further comprising a voltage sensing unit configured to measure a voltage of the main grid and provide a voltage signal to the energy storage system.

7. The power grid system of claim 6, wherein the energy storage system is configured to determine whether the power grid system is synchronized with the main grid according to the voltage signal.

8. The power grid system of claim 1, wherein the energy storage system is configured to send a closing command signal when the energy storage system determines the power grid system is synchronized with the main grid.

9. The power grid system of claim 1, wherein the energy storage system is configured to send a closing command signal to the switching module.

10. The power grid system of claim 9, wherein the IED is configured to initiate a closing operation of the switching device, and the energy storage system is configured to send the closing command signal to the IED.

11. The power grid system of claim 1, wherein the switching device is a high-voltage circuit breaker comprising a contact switch, wherein the switching device is coupled to a first winding of a transformer, the bus is coupled to a second winding of the transformer, and the transformer is configured to step down voltages.

12. The power grid system of claim 1 further comprising at least one distributed electric generator coupled to the bus.

13. The power grid system of claim 1 further comprising a transformer, wherein the transformer comprises a first winding coupled to the switching device and a second winding coupled to the bus.

14. A method for managing a power grid system, the power grid system comprising a switching module and an energy storage system and adapted to supply electric power to at least one load unit through a bus, the switching module comprising a switching device connected between the bus and a main grid and an intelligent electronic device (IED) coupled to the switching device, the energy storage system comprising a plurality of storage cells and configured to supply power electricity to the at least one load unit, the energy storage system coupled to the bus, the energy storage system and the switching module coupled by one or more cables, the method comprising:

monitoring electrical characteristics of power flowing through the switching device to determine a fault is occurring and tripping the switching device in response by the IED;

outputting a tripped signal by the switching device and transmitting the tripped signal directly to the energy storage system through the one or more cables, wherein the tripped signal is a feedback signal indicating a status of the switching device;

receiving the tripped signal from the switching module by the energy storage system through a receiver card of the energy storage system; and switching an operation mode of the energy storage system from a current source mode to a voltage source mode by a processing circuit of the energy storage system when the energy storage system receives the tripped signal.

15. The method of claim 14 further comprising:

closing the switching device;

receiving a closed signal from the switching module by the energy storage system; and switching the operation mode of the energy storage system from the voltage source mode to the current source mode when the energy storage system receives the closed signal.

16. The method of claim 15, wherein the closed signal is a feedback signal from the switching device.

17. The method of claim 15, wherein the method comprises transmitting the closed signal to the energy storage system through the one or more cables.

18. The method of claim 15, wherein closing the switching device comprises sending a closing command signal by the energy storage system to the switching module.

19. The method of claim 18 comprising sending the closing command signal when the energy storage system determines the power grid system is synchronized with the main grid.

20. The method of claim 15, wherein closing the switching device comprises sending a closing command signal by the energy storage system to the IED and initiating a closing operation of the switching device using the IED.

21. The method of claim 14 further comprising synchronizing the power grid system with the main grid when the energy storage system receives a reconnection command signal from a control system, wherein the bus comprises an AC bus, and the energy storage system comprises a DC/AC converter coupling an energy storage device to the bus.

22. The method of claim 14 further comprising measuring a voltage of the main grid and providing a voltage signal to the energy storage system using a voltage sensing unit.

23. The method of claim 22 further comprising determining whether the main grid is restored using the energy storage system according to the voltage signal.

24. The method of claim 22 further comprising determining whether the power grid system is synchronized with the main grid using the energy storage system according to the voltage signal.

25. The method of claim 14, wherein the switching device is a high-voltage circuit breaker coupled to a first winding of a transformer, the bus is coupled to a second winding of the transformer, and the transformer is configured to step down voltages; wherein tripping the switching device comprises opening contacts of the switching device.

* * * * *